(No Model.)
A. E. KUHNS & G. D. BEATTIE.
STEAM BOILER FOR COOKING FOOD.
No. 274,503. Patented Mar. 27, 1883.
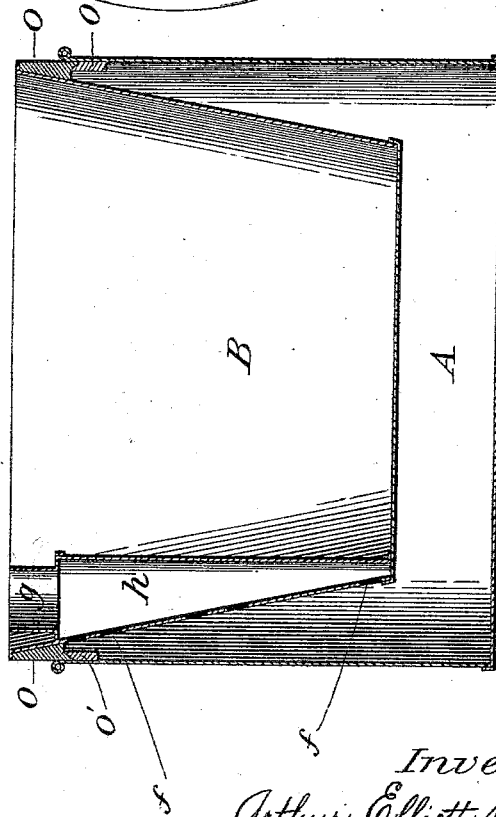
Witnesses:
Frank M. Baker.
Richard F. Kruse.
Inventors.
Arthur Elliott Kuhns,
George Davison Beattie.

UNITED STATES PATENT OFFICE.

ARTHUR E. KUHNS AND GEORGE D. BEATTIE, OF CHICAGO, ILLINOIS.

STEAM-BOILER FOR COOKING FOOD.

SPECIFICATION forming part of Letters Patent No. 274,503, dated March 27, 1883.

Application filed April 11, 1882. (No model.)

*To all whom it may concern:*

Be it known that we, ARTHUR ELLIOTT KUHNS and GEORGE DAVIDSON BEATTIE, citizens of the United States, residing in Chicago, in the county of Cook, State of Illinois, have jointly invented a new and useful Improvement in Steam-Boilers for Cooking Food; and we do hereby declare that the following is a full, clear, and exact description of our invention as set forth in the annexed specification, reference being had to the accompanying drawings.

Our invention relates to steam-boilers for culinary and domestic purposes.

The object of our invention is a steam-boiler of compact and convenient form to be operated by steam, so that the heat is more equally distributed to all parts of the boiler, and that the food can be either steamed or boiled. This we accomplish by having a receptacle within an outside vessel joining their upper edges with a tight-fitting joint, and having the cover so inclosed as to conduct the steam from the outside vessel to the inner receptacle in sufficient quantity to thoroughly agitate and cook the food.

In referring to the drawings, Figure 1 is a vertical sectional view of the boiler, showing one-half of the inner receptacle, B, the inclosure *h*, the tube *g*, and the matched rings O O and *o' o'*. Fig. 2 is a sectional view of the cover C, showing its relative position in a plane slightly above the boiler. Fig. 3 is the bottom of the cover C, with the openings of the tubes *d* and *e*, Fig. 2.

In Fig. 1, A is the outside vessel. B is the inner receptacle, of circular form and tapering toward its bottom, having its upper edge resting upon the upper edge of the ring O O, being fastened thereto by solder. *h* is an inclosure formed on the wall of the receptacle B, and covers the perforations *f f* therein. It is half-cylindrical in shape, with its edges soldered to the wall of the receptacle B. It is designed as a passage-way for the steam from the outside vessel, A, to the tube *g*. The vertical tube *g* is open at both ends, having its lower end fastened to the top of the inclosure *h* and covering an opening therein. The tube *g* extends upward to a level with the upper edge of the receptacle B, and is of a length sufficient to allow the bottom of the cover C, Fig. 2, to rest upon the shoulder formed on the top of the inclosure *h*.

O O and *o' o'* are matched rings, cast of iron and tinned. O O is permanently soldered to and forms a part of the receptacle B. *o' o'* is permanently soldered to the inside of the vessel A. The design of the rings is to form a separable joint, which at the same time will be tight-fitting, for the purpose of confining the steam within the outside vessel, A. When the cover C is closed on the boiler, the tube *g* is designed to fit into the tube *d*, Fig. 2, both tubes being of the same length, which practically prevents the boiling water from entering the receptacle B.

The cover C, Fig. 2, is of itself an inclosure having a beveled side which serves the purpose of a flange in an ordinary cover. It is constructed of a pressed seamless pan, forming the bottom and sides, having a top hemmed to the rim. The tube *d*, Fig. 2, extending within the cover C, is open at both ends, having its lower end secured to the bottom of the cover and inclosing an opening therein. The tube *d* attains the height of the rim of the cover C, and is made to fit over the tube *g*, Fig. 1. The tube *e*, Fig. 2, is similar to tube *d*, being open at both ends, and having its lower end secured to the bottom of the cover C, inclosing an opening therein at its center. The tube *e* extends somewhat higher than the tube *d*. The design of the cover C and the tubes *d* and *e* is to conduct the steam from the tube *g*, Fig. 1, to the inner receptacle, B, and to prevent the over-boil of water from reaching the food therein by forming a receptacle in the cover. The cover C is made to fit loosely to admit of an escape of steam.

In Fig. 2, *t* is a screw-cap covering an opening in the cover, and is used as a drain by inverting the cover after using. This drainage is necessitated by the over-boil of the water and the condensation of steam within the cover.

Referring to Fig. 4, *j* is a removable stopper, tubular in form and open at its end. It is made to fit closely into the tube *e*, Fig. 2, from without, and is a little longer. When inserted full length, the stopper is designed to completely shut off the steam from the receptacle B, Fig. 1, allowing food to be exclusively boiled in its own liquid when steam is not desirable. The stopper is provided with a row of holes near its base, and when drawn out to x x admits steam in small quantities to the receptacle B, Fig. 1, preferably used when cooking puddings.

Having fully described our invention, what we claim as new, and desire to secure by Letters Patent, is—

1. In steam-cookers having a receptacle within an outside vessel, the combination of the cover C, tubes d and e, Fig. 2, the inclosure h, and tube g, Fig. 1, for the purpose of conveying steam from the outside vessel, A, to the inner receptacle, B, all substantially as described.

2. In combination with steam-cookers, the cover C, with the tubes d and e, Fig. 2.

3. In combination with steam-cookers having a receptacle within an outside vessel, the matched rings O O and o' o', for the purposes specified.

ARTHUR ELLIOTT KUHNS.
GEORGE DAVIDSON BEATTIE.

Witnesses:
CLEMENT HERCHELRODE,
FRANK PERCY WEADON.